(12) United States Patent
Skorpik et al.

(10) Patent No.: US 10,290,195 B2
(45) Date of Patent: May 14, 2019

(54) SYSTEM AND METHOD OF DETECTING AND ANALYZING A THREAT IN A CONFINED ENVIRONMENT

(71) Applicant: BATTELLE MEMORIAL INSTITUTE, Richland, WA (US)

(72) Inventors: James R. Skorpik, Kennewick, WA (US); Michael S. Hughes, Richland, WA (US); Eric G. Gonzalez, Richland, WA (US)

(73) Assignee: Battelle Memorial Institute, Richland, WA (US)

(*) Notice: Subject to any disclaimer, the term of this patent is extended or adjusted under 35 U.S.C. 154(b) by 0 days.

(21) Appl. No.: 15/440,902

(22) Filed: Feb. 23, 2017

(65) Prior Publication Data
US 2017/0169686 A1 Jun. 15, 2017

Related U.S. Application Data

(63) Continuation-in-part of application No. 14/639,647, filed on Mar. 5, 2015.

(51) Int. Cl.
G08B 21/02 (2006.01)
G01S 5/18 (2006.01)
G08B 13/16 (2006.01)
G08B 29/18 (2006.01)
G08B 7/06 (2006.01)
G08B 25/00 (2006.01)
H04R 3/00 (2006.01)
G10L 25/51 (2013.01)

(52) U.S. Cl.
CPC ............. *G08B 21/02* (2013.01); *G01S 5/18* (2013.01); *G08B 13/1672* (2013.01); *G08B 29/185* (2013.01); *G08B 7/064* (2013.01); *G08B 25/009* (2013.01); *G10L 25/51* (2013.01); *H04R 3/005* (2013.01); *H04R 2499/11* (2013.01)

(58) Field of Classification Search
CPC .. G08B 21/02; G08B 29/188; G08B 21/0272; G08B 17/08; G08B 25/10; G01S 5/18
See application file for complete search history.

(56) References Cited

U.S. PATENT DOCUMENTS

| 5,455,868 | A | 10/1995 | Sergent et al. |
| 5,917,775 | A | 6/1999 | Salisbury |
| 6,847,587 | B2 | 1/2005 | Patterson et al. |
| 7,401,519 | B2 * | 7/2008 | Kardous .................. G01H 3/06 381/56 |

(Continued)

FOREIGN PATENT DOCUMENTS

WO 2014134217 A1 9/2014

OTHER PUBLICATIONS

Chacon-Rodriguez, A., et al., Evaluation of Gunshot Detection Algorithms, IEEE Transactions on Circuits and Systems—I: Regular Papers vol. 58, No. 2, 2011, 363-372.

(Continued)

Primary Examiner — Ryan W Sherwin
(74) Attorney, Agent, or Firm — Wells St. John P.S.

(57) ABSTRACT

A system and method of detecting and analyzing a threat in a confined environment is disclosed. An audio board detects and analyzes audio signals which are then transmitted and analyzed to determine the location of a gunshot in a confined location and the type of firearm being shot.

7 Claims, 13 Drawing Sheets

(56) References Cited

U.S. PATENT DOCUMENTS

| | | | |
|---|---|---|---|
| 7,961,550 | B2 | 6/2011 | Calhoun |
| 8,511,145 | B1 | 8/2013 | Desai et al. |
| 2003/0021188 | A1* | 1/2003 | Baranek .................. G08B 7/066 367/136 |
| 2009/0112525 | A1 | 4/2009 | Adani |
| 2013/0202120 | A1 | 8/2013 | Bickel et al. |
| 2014/0361886 | A1 | 12/2014 | Cowdry |
| 2015/0070166 | A1* | 3/2015 | Boyden .................. G08B 25/08 340/540 |
| 2015/0371638 | A1* | 12/2015 | Ma ........................ G10L 15/065 704/275 |
| 2016/0232774 | A1 | 8/2016 | Noland et al. |
| 2016/0260307 | A1 | 9/2016 | Skorpik et al. |

OTHER PUBLICATIONS

Duckworth, G. L., et al., Acoustic counter-sniper system, SPIE International Symposium on Enabling Technologies for Law Enforcement and Security, 2938, 1996, 262-275.

Khan, S., et al., Weapon Identification Using Hierarchical Classification of Acoustic Signatures, Proc. of SPIE, vol. 7305, 1-5.

Maher, R. C., Modeling and Signal Processing of Acoustic Gunshot Recordings, Proc. 2nd Signal Process. Educ. Workshop, 4th Digital Signal Process. Workshop, 2006, 257-261.

Sadler, B. M., et al., Optimal and Robust Shockwave Detection and Estimation, 1997 IEEE International Conference on Acoustics, Speech, and Signal Processing, 1997, ICASSP-97, 1997, 1889-1892.

Stoughton, R., Measurements of small-caliber ballistic shop waves in air, Journal of the Acoustical Society of America, 102, 2, 1997, 781-787.

Weissler, P. G., et al., Noise of Police Firearms, Journal of the Acoustical Society of America, 1974, 56, 5, 1515-1522.

Khalid, M. A., et al., Gunshot Detection and Localization Using Sensor Networks, Proc. of the IEEE International Conference on Smart Instrumentation, Measurement and Applications (ICSIMA), Nov. 26-27, 2013, Kuala Lumpur, Malasia, 1-6.

Luzi, L., et al., Acoustic firearm discharge detection and classification in an enclosed environment, J. Acoust. Soc. Am., 139, May 5, 2016, 2723-2731.

Maher, R. C., Acoustical Characterization of Gunshots, Department of Electrical and Computer Engineering, Montana State University, 2007, 1-5.

Sinha, P., et al., Sniper Localization Using Passive Acoustic Measurements Over an Ad-hoc Sensor Array, Department of Electrical Engineering, Indian Institute of Technology, Kanpur, India, 2015, 1-6.

Hughes et al., "Additional Results for 'Joint Entropy of Continuously Differentiable Ultrasonic Waveforms' [J. Acoust. Soc. Am. 133(1), 283-300 (2013)] (L)", Journal of the Acoustical Society of America vol. 137, No. 1, Jan. 2015, United States, p. 501.

Hughes et al., "Application of Renyi Entropy for Ultrasonic Molecular Imaging", Journal of the Acoustical Society of America vol. 125, No. 5, May 2009, United States, pp. 3141-3145.

Hughes et al., "Characterization of Digital Waveforms using Thermodynamic Analogs: Applications to Detection of Materials Defects", IEEE Transactions on Ultrasonics, Ferroelectrics, and Frequency Control vol. 52, No. 9, Sep. 2005, United States, pp. 1555-1564.

Hughes et al., "Characterization of Digital Waveforms using Thermodynamic Analogs: Detection of Contrast-Targeted Tissue In Vivo", IEEE Transactions on Ultrasonics, Ferroelectrics, and Frequency Control vol. 53, No. 9, Sep. 2006, United Stated, pp. 1609-1616.

Hughes et al., "Entropy vs. Energy Waveform Processing: A Comparison Based on the Heat Equation", Entropy vol. 17, 2015; Switzerland, pp. 3518-3551.

Hughes et al., "High Contrast Ultrasonic Imaging of Resin-Rich Regions in Graphite/Epoxy Composites using Entropy", AIP Conference Praceedings 1706, 2016, United States, 7 pages.

Hughes et al., "Improved Signal Processing to Detect Cancer by Ultrasonic Molecular Imaging of Targeted Nanoparticles", Journal of the Acoustical Society of America vol. 129, No. 6, Jun. 2011, United States, pp. 3756-3767.

Hughes et al., "Joint Entropy of Continuously Differentiable Ultrasonic Waveforms", Journal of the Acoustical Society of America vol. 133, No. 1, Jan. 2013, United States, pp. 283-300.

Hughes et al., "Properties of an Entropy-Based Signal Receiver with an Application to Ultrasonic Molecular Imaging", Journal of the Acoustical Society of America vol. 121, No. 6, Jun. 2007, United States, pp. 3542-3557.

Hughes et al., "Real-Time Calculation of a Limiting Form of the Renyi Entropy Applied to Detection of Subtle Changes in Scattering Architecture", Journal of the Acoustical Society of America vol. 126, No. 5, Nov. 2009, United States, pp. 2350-2358.

Hughes et al., "Sensitive Ultrasonic Detection of Dystrophic Skeletal Muscle in Patients with Duchenne Muscular Dystrophy using an Entropy-Based Signal Receiver", Ultrasound in Medicine & Biology vol. 133, No. 8, 2007, United States, pp. 1236-1243.

Hughes et al., "Use of Smoothing Splines for Analysis of Backscattered Ultrasonic Waveforms: Application to Monitoring of Steroid Treatment of Dystrophic Mice", IEEE Trans. on Ultrasonics, Ferroelectrics, & Frequency Control vol. 58, No. 11, Nov. 2011, United States, pp. 2361-2369.

Hughes, "A Comparison of Shannon Entropy Versus Signal Energy for Acoustic Detection of Artificially Induced Defects in Plexiglas", Journal of the Acoustical Society of America vol. 91, No. 4, Apr. 1992, United States, pp. 2272-2275.

Hughes, "Analysis of Digitized Waveforms using Shannon Entropy", Journal of the Acoustical Society of America vol. 93, No. 2, Feb. 1993, United States, pp. 892-906.

Hughes, "Analysis of Digitized Waveforms using Shannon Entropy. II. High-Speed Algorithms Based on Green's Functions", Journal of the Acoustical Society of America vol. 95, No. 5, May 1994, United States, pp. 2582-2588.

Hughes, "Analysis of Ultrasonic Waveforms using Shannon Entropy", IEEE Ultrasonics Symposium, 1992, United States, pp. 1205-1209.

Larche et al., "A Comparison of Different NDE Signal Processing Techniques Based of Waveform Entropies Applied to Long Fiber-Graphite/Epoxy-Plates", Proceedings of SPIE vol. 10169, 2017, United States, 11 pages.

Lathi, "Modern Digital and Analog Communication Systems", Section 2.1, 3rd Edition, New York, Oxford University Press, 1998, pp. 14-20.

Maurizi, "Estimation of an Entropy-Based Functional", Entropy vol. 12, Mar. 3, 2010, Switzerland, pp. 338-374.

Wallace et al., "Sensitive Ultrasonic Delineation of Steroid Treatment in Living Dystrophic Mice with Energy-Based and Entropy-Based Radio Frequency Signal Processing", IEEE Trans. on Ultrasonics, Ferroelectrics, & Frequency Control vol. 54, No. 11, Nov. 2007, United States, pp. 2291-2299.

* cited by examiner

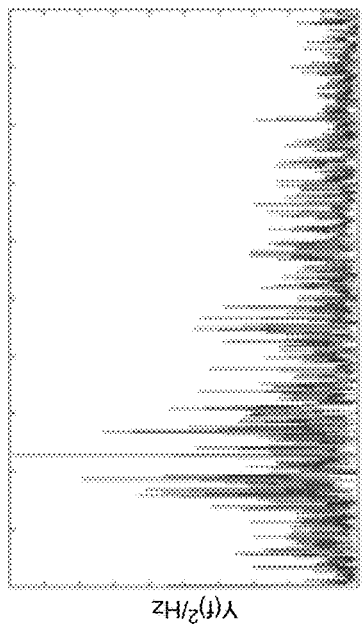
Fig. 7C Power Spectrum of Event
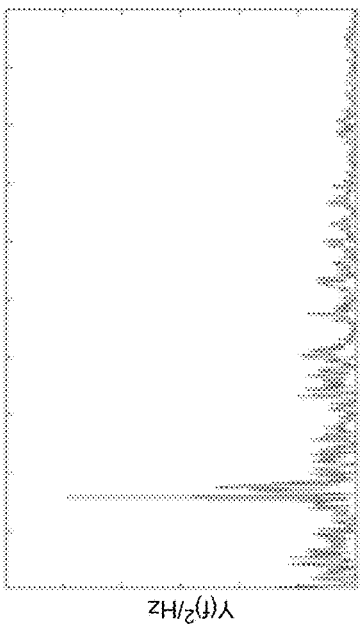
Fig. 7D Power Spectrum of Event
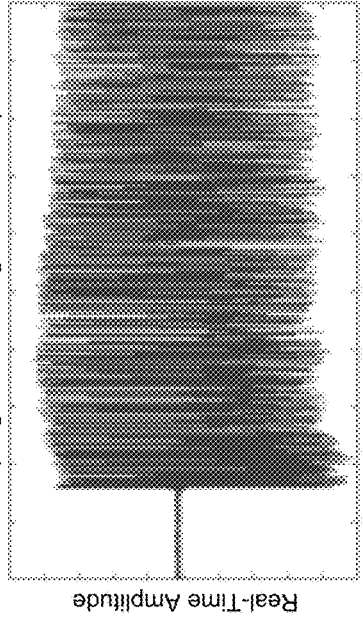
Fig. 7A 38 Revolver (Large Room Firing From Center)
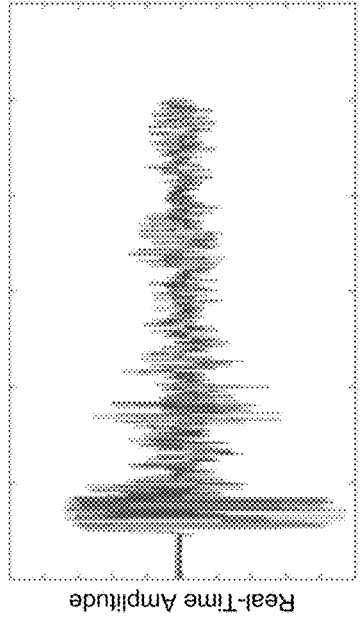
Fig. 7B Balloon Pop (Large Room Firing From Center)
ALARMS ← → REJECTS

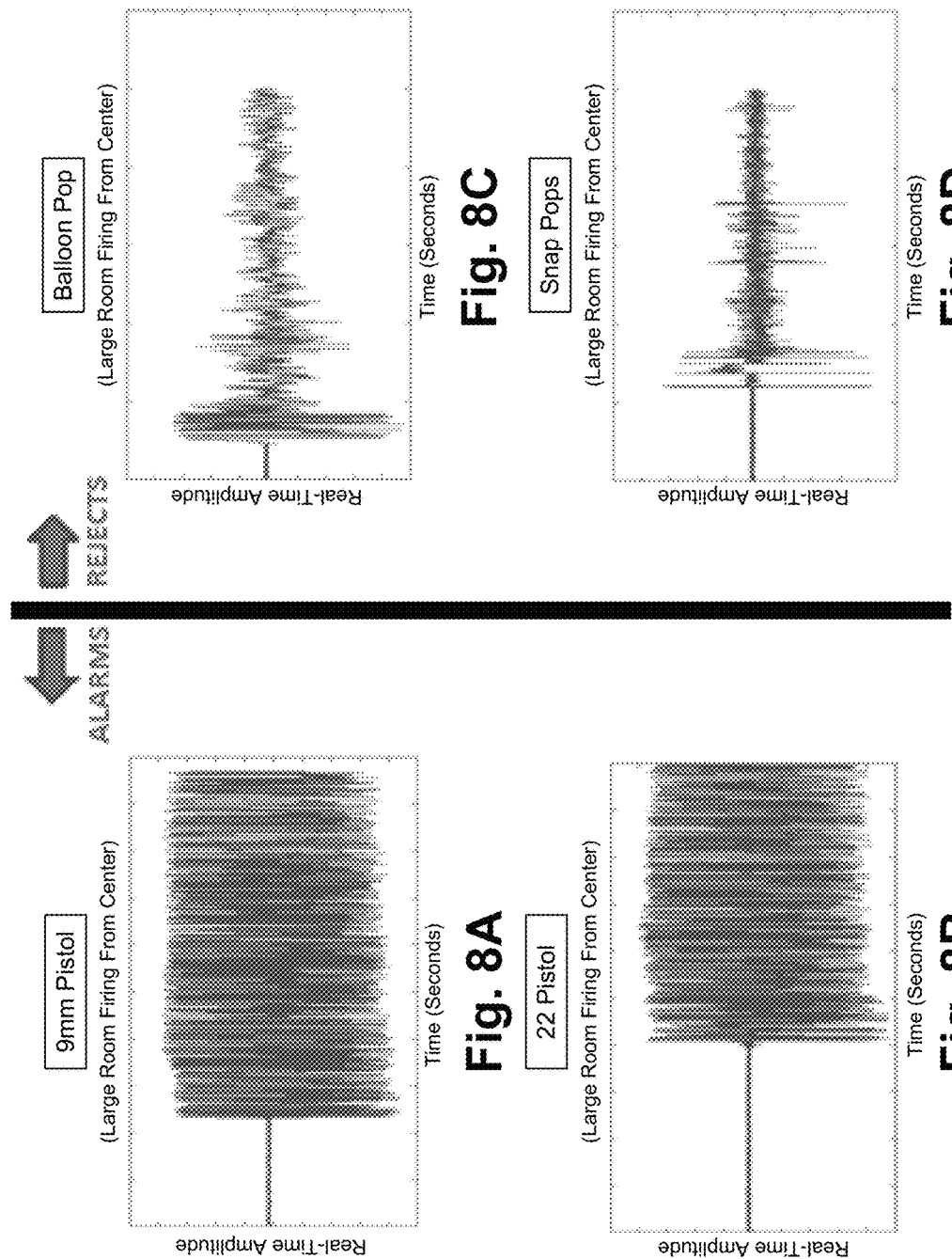

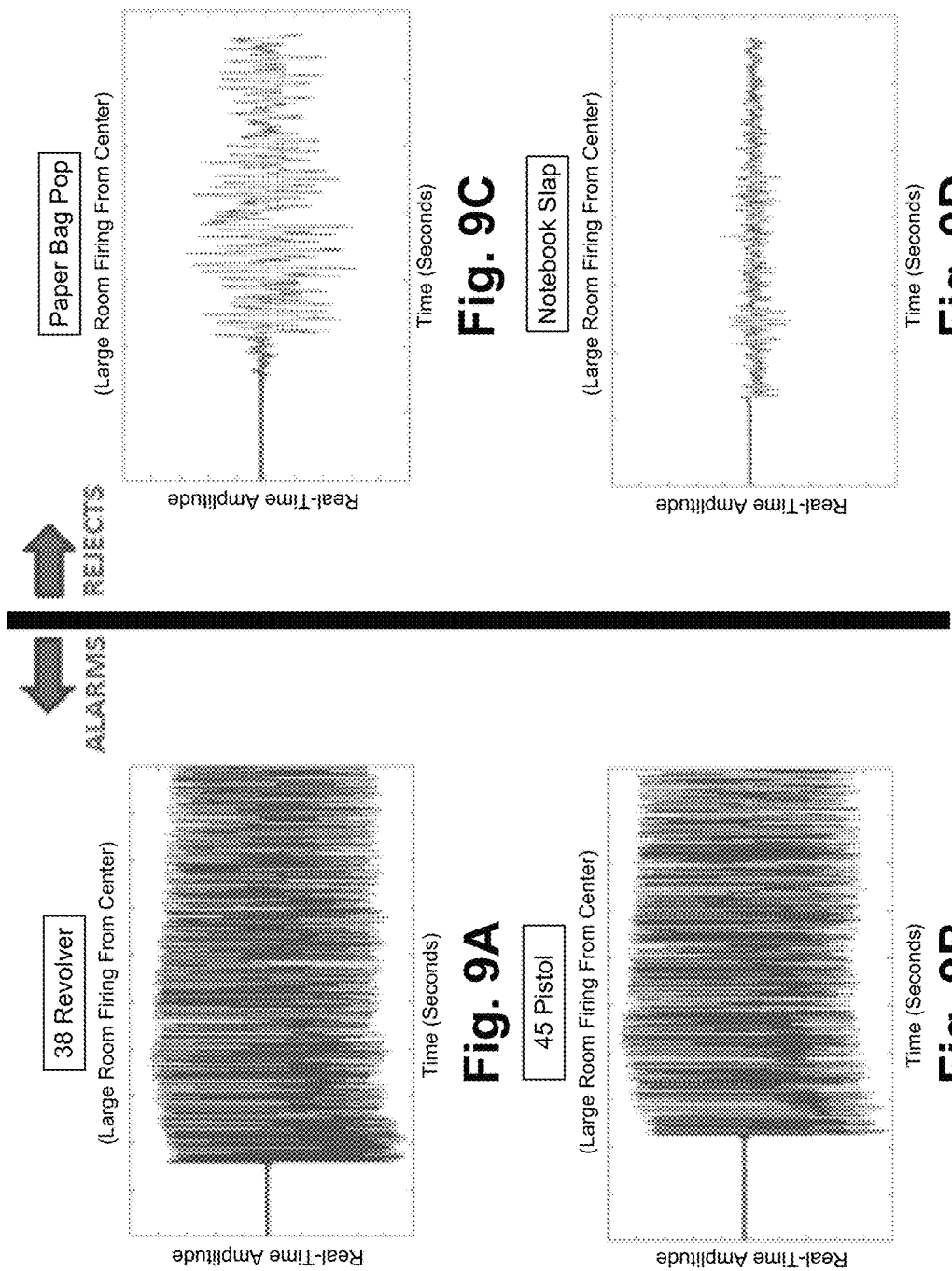

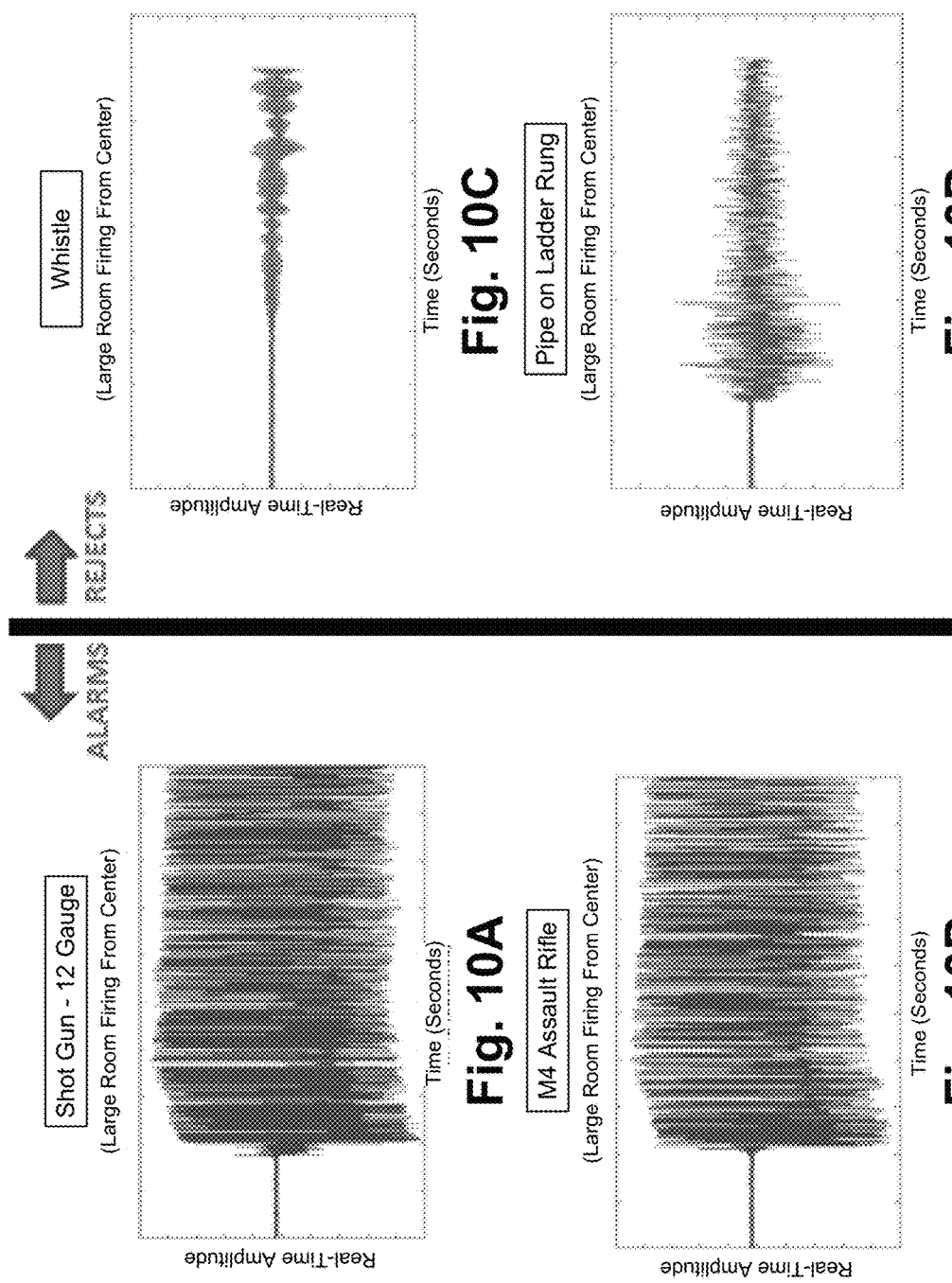

SYSTEM AND METHOD OF DETECTING AND ANALYZING A THREAT IN A CONFINED ENVIRONMENT

PRIORITY

This invention claims priority from and is a continuation in part of a currently pending patent application Ser. No. 14/639,647 filed Mar. 5, 2015, the contents of which are hereby incorporated by reference in their entirety.

STATEMENT REGARDING FEDERALLY SPONSORED RESEARCH OR DEVELOPMENT

This invention was made with Government support under Contract DE-AC0576RL01830 awarded by the U.S. Department of Energy. The Government has certain rights in the invention.

TECHNICAL FIELD

This invention relates to sensor systems. More specifically, this invention relates to a gunshot detection method and system which can distinguish between threats and non-threats and determine the type of weapon or weapons used, including measuring the number of rounds fired, in a confined environment.

BACKGROUND

Incidents involving active shooters such as shootings in a confined environment like a school or classroom have been increasing yearly and the statistics associated with them indicate that "a life is lost every 15 seconds." Therefore it is important that first responders "locate and engage" the shooter as quickly as possible.

Gunshots are significant energy events having both large audio decibel levels and long signal durations of up to half a second. Both of these attributes are enhanced by reflections from the walls and the floor, which increases the signal duration by the associated delayed arrival of the signal multi-paths. The large amounts of energy released by a weapon discharge also generate significant nonlinearities which result in the generation of higher harmonics.

Most current gunshot detection systems are designed for deployment in an open-air environment, such as a street, battlefield, ocean, or wilderness region such as a rain forest. In open environment, there is nearly infinite space, and the sound wave of a gunshot is, to first approximation, free to propagate without significant reflections from nearby boundaries. In this environment, features of the shock wave or shock front (e.g., rise time, rise slope) produced by the discharge can be analyzed.

In a confined or substantially closed environment, there are several complications to using such a methodology. In addition to the sound of the gunshot itself, the sound of the bullet impacting a wall or target close to the gunshot, and reflections off of walls, ceilings, floor and other items near the discharge create complication and generate potentially conflicting signals. In this setting, the shock wave or shock front from the explosion moves at a certain speed and is distorted due to multiple reflections. So using the shock front in a confined space such as a room, as opposed to an open environment, would require an extremely difficult analysis that would necessitate incorporation of the complex boundary geometry particular to the room in which the weapon was discharged.

What is needed is a sensor system which can detect and analyze the gunshot in a confined environment to distinguish between threats and non-threats, determine the type(s) of weapons involved and the number of rounds fired, and doing so without requiring room-specific signal analysis. The present disclosure provides a description of such a system and method.

SUMMARY

The present invention is directed to methods, systems, and devices for detecting and analyzing a threat in a confined environment. In one embodiment, a system for detecting and analyzing a threat in a confined environment is disclosed. In another embodiment a methodology for analyzing this data is described. In one embodiment the system includes a sensor, in this case a microphone for receiving acoustic signals from the confined environment and an amplifier to increase the amplitude of the audio signals received by the sensor. The audio signals are then passed through a first band-pass filter whose output contains energy within a first frequency range, and a second band-pass filter whose output contains energy within a second frequency range. An analog-to-digital converter digitizes the amplified and filtered signals to produce digital waveforms, and a microcontroller receives and analyzes the digital signals. In one embodiment the microcontroller computes signal energy to distinguish between a threat and a non-threat event and measure or count pulses if the event is a threat. The signal energy may be defined as, but is not limited to, the sum of the squared voltages contained in the digital signal or a portion thereof.

In one embodiment, the first frequency range is between 5 kHz and 30 kHz, and the second frequency range is between 0.9 MHz and 1.0 MHz. The system may also further comprise a transceiver coupled to the microcontroller. The transceiver transmits the signals to at least one of the following for emergency response: a computer, a mobile device, a data storage device, and a central alarm system. In some embodiments, the microcontroller has a central processing unit (CPU) for analyzing the signals. The system may further comprise at least one of the following: a power source, a camera coupled to the microcontroller, and a smoke alarm module. In one application the threat could be a gunshot, and the confined environment may be a school house, a classroom, a public building, a shopping mall, a vehicle, a theater, a housing unit, a tavern, or a food market.

In another embodiment of the present invention, a device for detecting and analyzing a threat in a confined environment is disclosed. The device includes an audio board for detection and analysis of audio signals. The device also includes a RF board for transmitting the signals for emergency response. In some applications the device further includes a battery for providing power to the audio board and the RF board. The audio board includes a microcontroller with at least one band-pass filter for distinguishing between a threat and a non-threat event and for measuring or counting pulses if the event is a threat. The audio board may include an amplifier to increase amplitude of the signals and an analog-to-digital converter for digitizing the amplified and filtered signals to produce digital waveforms. In some embodiments the audio board could include a camera and/or a smoke alarm module. A microcontroller includes a CPU for analyzing the signals, and also indicates the amount of energy in the at least one band-pass filtered signal. In one instantiation the energy contained in the at least one band-pass filtered signal is measured in a 5 kHz to 30 kHz frequency range and in a 0.9 MHz to 1.0 MHz frequency range. The measured signal in the 5 to 30 kHz range is used to distinguish between threat and non-threat events, and the measured signal in the 0.9 MHz to 1.0 MHz range is used to measure number of weapon discharges. The RF board can include a transceiver for transmitting the signals to the emergency response, which may be a computer, a mobile device, a data storage device, and/or a central alarm system.

In another embodiment a method of detecting and analyzing a threat in a confined environment is disclosed. The method includes receiving one or more acoustic signals from the confined environment; measuring energy in a frequency range using a first band-pass filter; and measuring pulses in a time domain using a second band-pass filter. In another embodiment the method includes receiving audio signals from the confined environment; and measuring or counting a number of zero crossings of the signals in at least one of a plurality of separate time interval windows to distinguish between a threat and a non-threat event and a type of threat including between a rifle, a shotgun, an assault rifle, a pistol, a revolver, or an explosive charge.

In another embodiment a method for determining the type and location of firearm discharge in a confined environment is disclosed wherein a digitized acoustic signals from a sensor within the confined environment is received, a logarithmic value of a signal intensity from the signal is calculated, a logarithmic value of a joint entropy value from the signal is calculated and the logarithmic values of signal intensity and joint entropy are statistically analyzed to determine the type and location of the firearm discharge.

BRIEF DESCRIPTION OF THE DRAWINGS

FIGS. 7A-D shows the acoustic waveforms in real-time amplitude vs. time (FIGS. 7A and 7B) and power spectral density in the frequency domain (FIGS. 7C and 7D) for a weapon alarm event (38 revolver) and for a classroom reject event (balloon pop).

FIGS. 8A-D shows the acoustic waveforms in real-time amplitude vs. time for weapon alarm events FIG. 8A (9 mm pistol) and FIG. 8B (22 pistol) and for classroom reject events FIG. 8C (balloon pop) and FIG. 8D (snap pop).

FIGS. 9A-D shows the acoustic waveforms in real-time amplitude vs. time for weapon alarm events FIG. 9A (38 revolver) and FIG. 9B (45 pistol) and for classroom reject events FIG. 9C (paper bag pop) and FIG. 9D (notebook slap).

FIGS. 10A-D shows the acoustic waveforms in real-time amplitude vs. time for weapon alarm events FIG. 10A (shot gun—12 Gauge) and FIG. 10B (M4 Assault Rifle) and for classroom reject events FIG. 10C (whistle) and FIG. 10D (pipe on ladder rung).

DETAILED DESCRIPTION OF THE PREFERRED EMBODIMENTS

The following description includes the preferred best mode of embodiments of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

The present invention includes methods, systems and devices directed to detecting and authenticating the presence of a threat in a confined environment. The threat may be, but is not limited to, an active shooter. The confined environment may be, but is not limited to, a school or classroom setting.

In one embodiment, the system of the present invention is a miniature, low cost system that would reside within school classrooms. It can be battery operated and have a wireless reporting link to a central alarm system for emergency '911' response.

The present invention can distinguish normal classroom events from gun shots. The present invention is designed for confined environments, has a very low item cost, is simple to install, and also provides exact shooter location.

The present invention uses the time-domain and/or frequency domain for signal analysis to separate gunshot from normal expected classroom or other confined environment sounds. Signal filtering may be implemented both in hardware such as, but not limited to, microphone baffles and analog filtering, and in firmware such as, but not limited to, digital band-pass filtering.

In one embodiment, the present invention utilizes energy analysis that combines to amplitude and signal duration.

Systems, devices, and methods of the present invention can also count the number of shots fired as a confirmation on the basis that repetitive signals have features that can only come from a weapon. In another embodiment, the present invention can determine the type of weapon or weapons used.

In contrast to the high energy gunshot signatures, normal classroom audio events have considerably lower amplitude decibel levels in addition to much shorter signal durations. In one embodiment, a detection threshold is used that must be exceeded before any analysis will occur. This will be a power saving feature and will also self-reject normal classroom audio activity.

Figure 1:
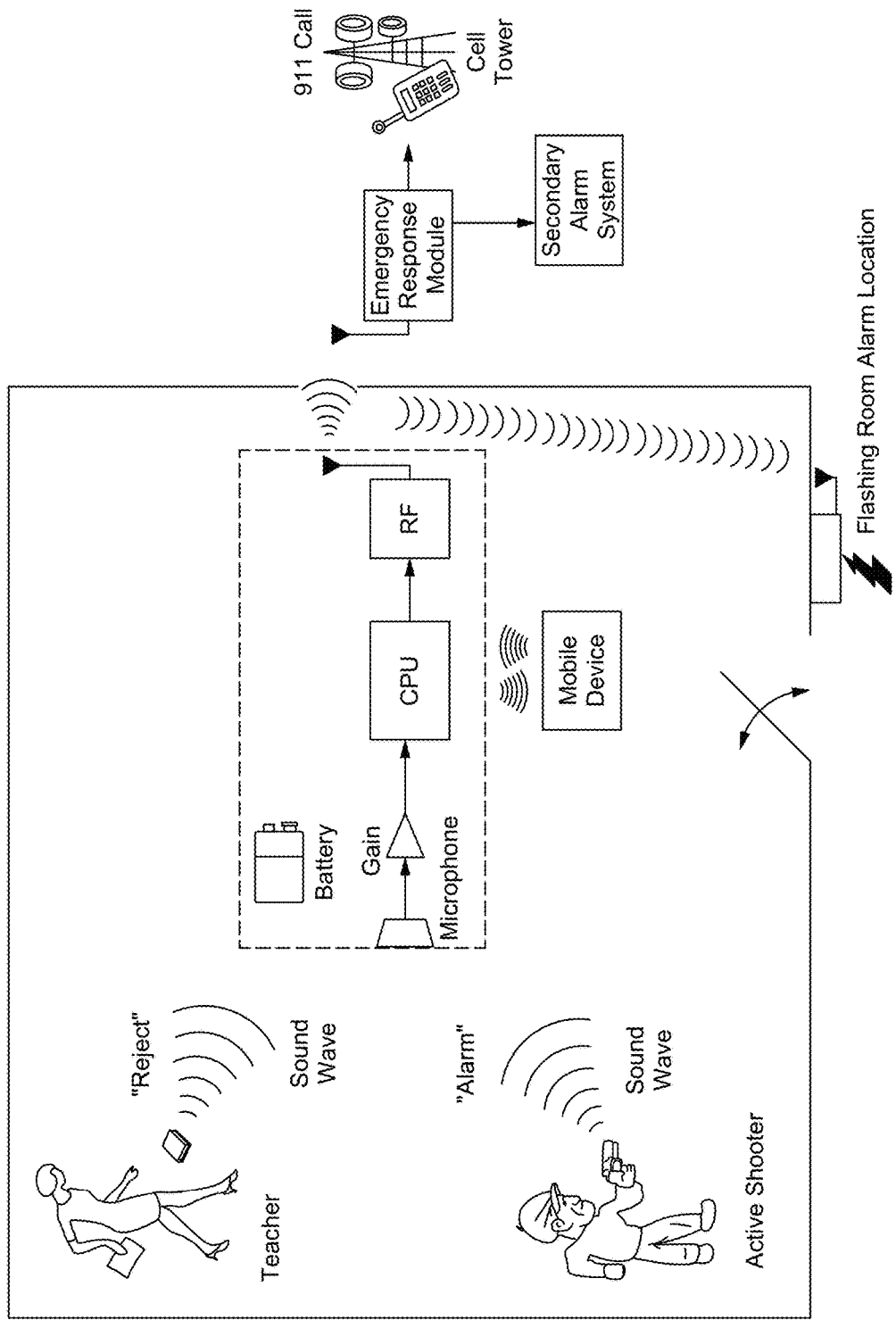
FIG. 1 is a schematic diagram of a system for detecting and analyzing a threat in a confined environment, in accordance with one embodiment of the present invention.

FIG. 1 is a schematic diagram of a system for detecting and analyzing a threat in a confined environment, in accordance with one embodiment of the present invention. The system is designed to sound an alarm when the sound waves are from an active shooter and reject (no alarm) when the sound waves are normal classroom events such as the sound made from a book dropped by a teacher or the slamming of a door.

Still referring to FIG. 1, the system includes a microphone for receiving acoustic signals from the confined environment, an amplifier to increase amplitude of the audio signals, a microcontroller including a central processing unit (CPU) for analyzing the signals, a power source or battery, and a transceiver, coupled to the CPU, for transmitting the signals to one or more of the following for emergency response: a mobile device or tablet, a central or local alarm system or module, and/or a data storage device or reader. The emergency response module may be coupled to a cell tower and/or a secondary alarm system such as a computer, reader or storage device.

The system includes one or more filters whose output contains energy within a certain frequency range. In one embodiment, the system includes a first band-pass filter whose output contains energy within a frequency range between approximately 5 kHz and approximately 30 kHz, and a second band-pass filter whose output contains energy within a frequency range between approximately 0.9 MHz and 1.0 MHz.

Figure 2:
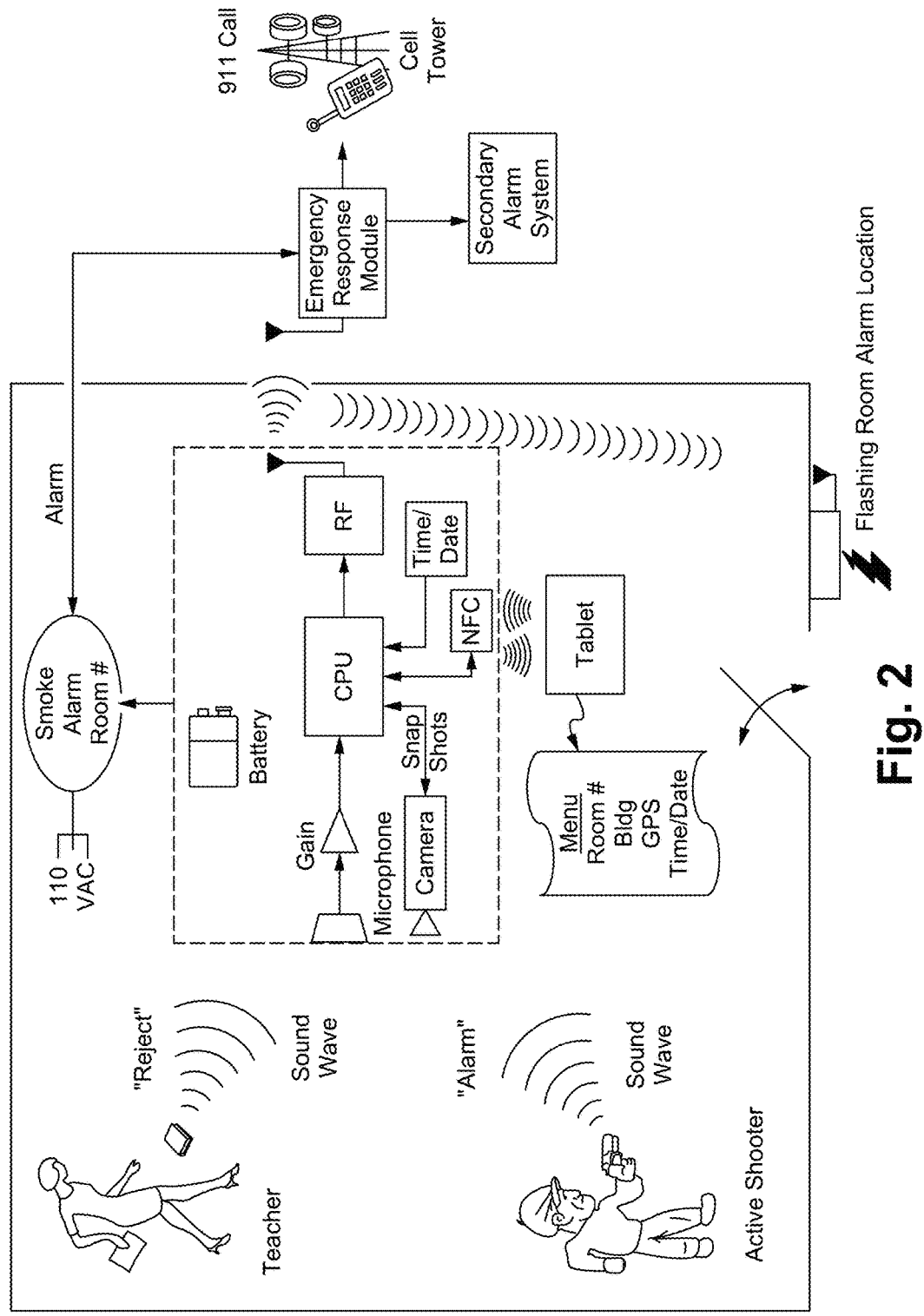
FIG. 2 is a schematic diagram of a system for detecting and analyzing a threat in a confined environment, in accordance with one embodiment of the present invention.

FIG. 2 is a schematic diagram of a system for detecting and analyzing a threat in a confined environment, similar to FIG. 1, in accordance with one embodiment of the present invention. In addition to the embodiment as shown in FIG. 1, the embodiment of FIG. 2 further includes a camera coupled to the CPU, a smoke alarm module coupled to a 110 VAC power source, which can be feed into the emergency response module, near field communications (NFC) technology to enable communications between the CPU and a mobile device such as a tablet. The tablet can include a menu that displays, for example, the room or classroom number, building, GPS, and local time and date. The system can also include data and time hardware coupled to the CPU for keeping track of dates and times of any threats.

Figure 3:
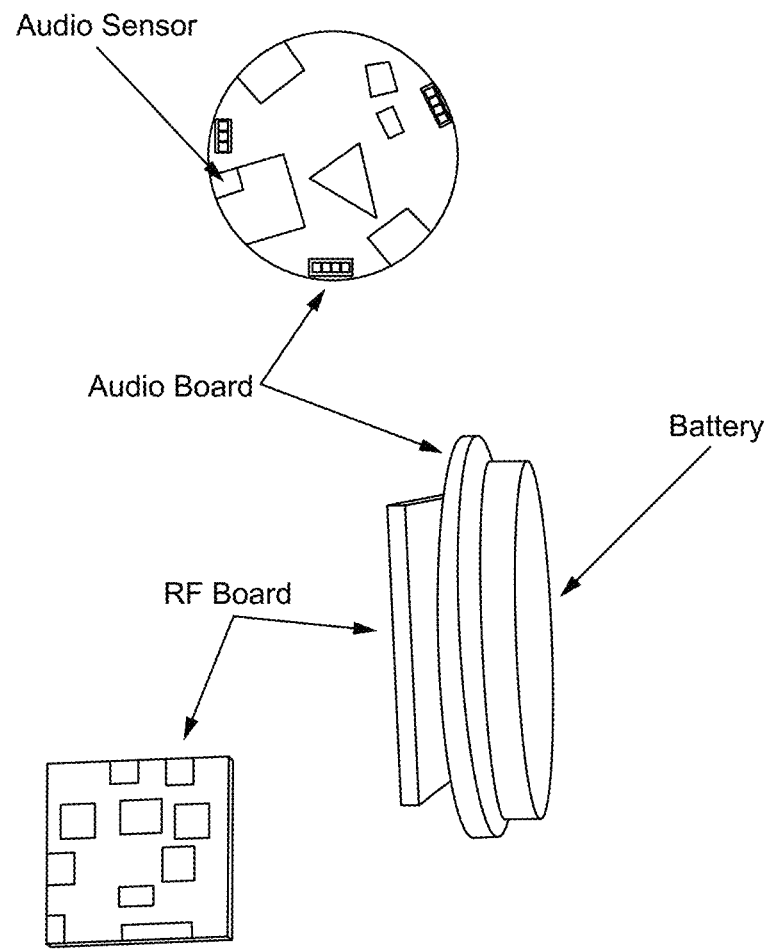
FIG. 3 is a diagram of a device for detecting and analyzing a threat in a confined environment, in accordance with one embodiment of the present invention.

FIG. 3 is a diagram of a device for detecting and analyzing a threat in a confined environment, in accordance with one embodiment of the present invention. The device includes an audio board for detection and analysis of audio signals, a RF board for transmitting the signals for emergency response, and a battery for providing power to the audio board and the RF board. The audio board includes at least one band-pass filter for distinguishing between a threat and a non-threat and for measuring or counting pulses if the event is a threat.

In one embodiment, the device of FIG. 3 comprises two printed circuits—the audio and RF boards—and a battery. The battery can be, but is not limited to, a coin cell battery. The audio board includes a microphone for detection of audio sounds. The microphone may be a cellphone microphone. An audio decibel level activated trigger instigates digitization of the audio signal by an on-board microcontroller. The digitized signal is analyzed by algorithms to determine if the audio signal is from a weapon or threat for alarm indication. If an alarm is triggered, a data packet is sent from the audio board to the RF board for wireless transmission to an emergency alarm module located inside or outside of the room. The transmitted wireless packet would consist of information deemed valuable to a first responder, such as room location, room number, time-stamp, and associated weapon attributes including weapon type and number of rounds fired. System setup for room specifics can be loaded via a wireless link or NFC from a mobile device such as a tablet or smart phone. In one embodiment, the device can be hidden, housed, or installed in an innocuous device, for example, a real or fake smoke detector or an LED light bulb, which would provide power to the device. In that case, the battery of the device would be optional.

Figure 4:
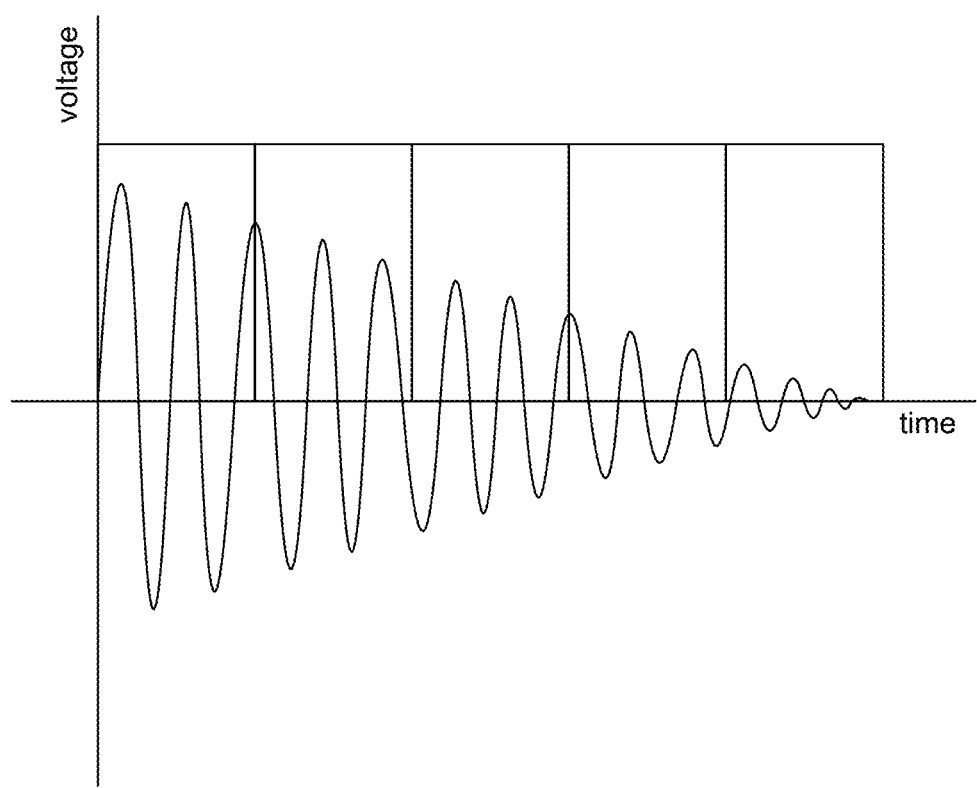
FIG. 4 depicts a measuring technique performed by the method of detecting and analyzing a threat in a confined environment, in accordance with one embodiment of the present invention.

FIG. 4 depicts a measuring technique performed by the method of detecting and analyzing a threat in a confined environment, in accordance with one embodiment of the present invention. Audio signals are received from a confined environment. The number of zero crossings of the signals are measured or counted in a plurality of separate time interval windows to distinguish between a threat and a non-threat event, including the type of threat.

In one embodiment, each time window is less than about 500 milliseconds.

The type of threat distinguished may be between a rifle, shotgun, assault rifle, pistol, revolver, and/or an explosive charge.

EXPERIMENTAL SECTION

The following examples serve to illustrate embodiments and aspects of the present invention and should not be construed as limiting the scope thereof.

Example 1

Acquisition of Data Signatures

Three data collections sessions were acquired from the Hanford Patrol Shoot House, which is a facility in Richland, Wash., used for training purposes. It consists of a matrix of adjoining rooms but without a ceiling. There is a catwalk in place of the ceiling for instructor evaluation of training exercises. The walls are steel-lined to allow for live shooting into "traps".

Two sessions at the Shoot House involved personnel firing preselected weapons. The shooters fired long barrels (shotguns), pistols (22, 9 mm, and 45), a revolver (38) and an assault rifle (M4, which is a shortened version of a M16).

Another session consisted of acquiring audio signatures from classroom events that have some of the similar features as a weapon such as large decibel levels (balloon pop) and long durations (whistle).

Two sensing systems using the cellphone microphones were used at fixed ceiling height locations with firing positions at six different room locations. The three sessions—two for firing the weapons and one for the classroom noises—resulted in 15 gigabytes of data for post analysis.

Figure 5:
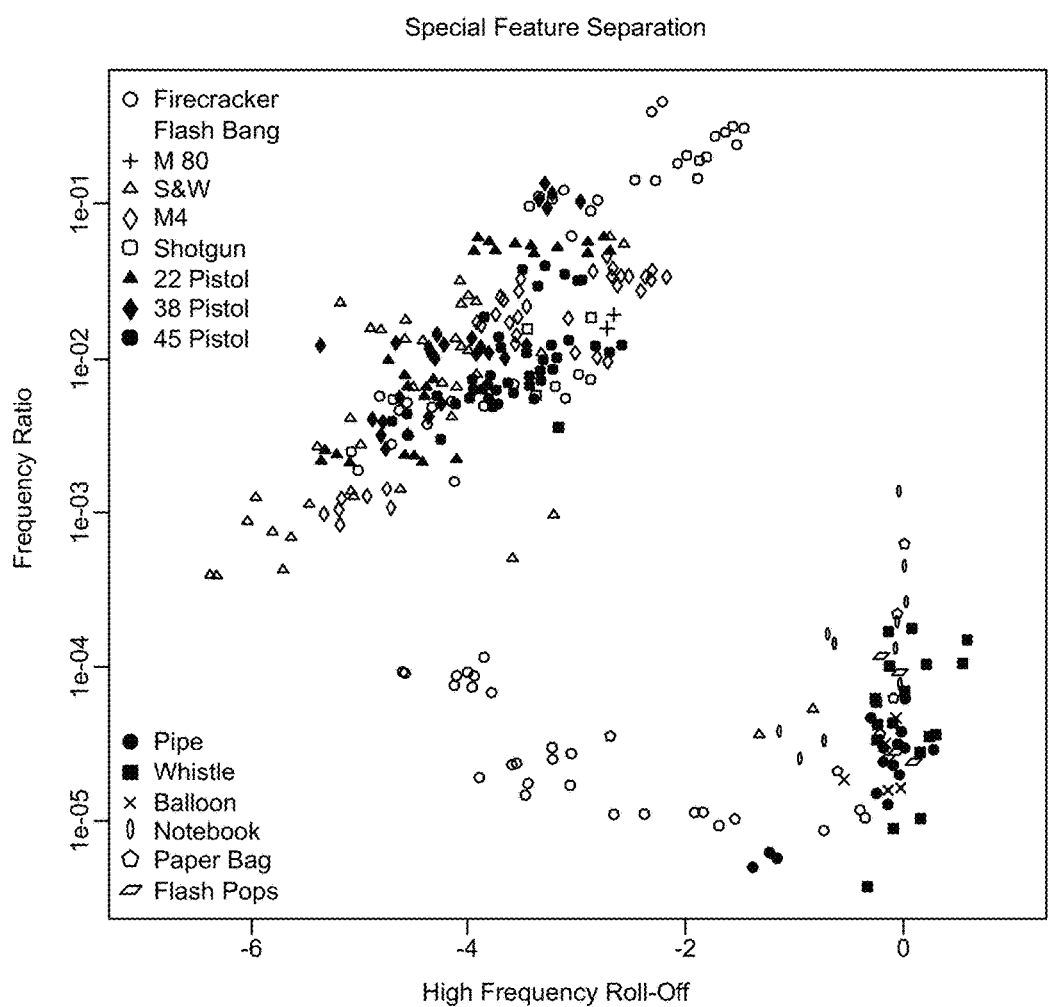
FIG. 5 provides a visualization of the frequency ratios of gun shots or threats on the top left of the spectrum and other classroom noise or non-threats on the bottom right of the spectrum, and included in the data is the high frequency roll-off of the measurements.
Figure 6:
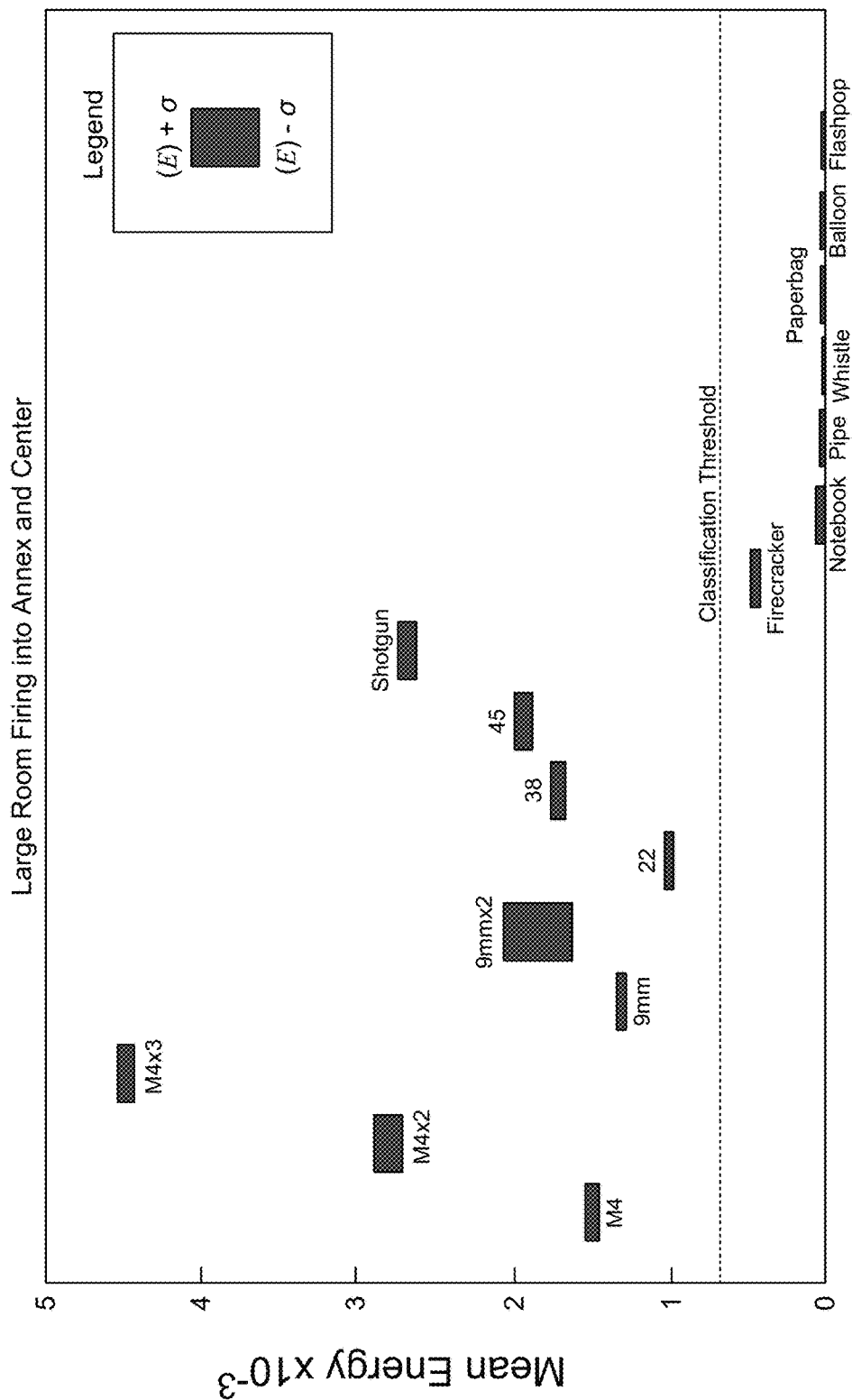
FIG. 6 provides a visualization of the mean energies from various types of guns or threats and other noises or non-threats, acquired in large rooms and shooting centers. If the signal energy is above the classification threshold then the event is classified as a threat.

FIGS. 5 and 6 show summary graphs depicting robustness in separating shots from classroom events. FIG. 5 provides a visualization of the frequency ratios of gun shots or threats on the top left of the spectrum and other classroom noise or non-threats on the bottom right of the spectrum, and included in the data is the high frequency roll-off of the measurements. This data analysis method utilizes signal frequency content.

FIG. 6 provides a visualization of the mean energies from various types of guns or threats and other noises or non-threats, acquired in large rooms and shooting centers. If the mean energy is above the classification threshold then the event is classified as a threat. This data analysis method utilizes signal energy content.

FIGS. 7A-D shows the acoustic waveforms in real-time amplitude vs. time (FIGS. 7A and 7B) and power spectral density in the frequency domain (FIGS. 7C and 7D) for a weapon alarm event (38 revolver) and for a classroom reject event (balloon pop). The data was collected from the Shoot House, as described above, and analyzed using the analysis methods of the present invention in the time domain and the frequency domain. Both the time domain and frequency domain methods indicated success in separating gunshots from normal expected classroom noises.

As compared to the classroom sounds, the gunshots exhibited larger audio decibels within certain frequency ranges and had longer signal durations.

FIGS. 8A-D shows the acoustic waveforms in real-time amplitude vs. time for weapon alarm events FIG. 8A (9 mm pistol) and FIG. 8B (22 pistol) and for classroom reject events FIG. 8C (balloon pop) and FIG. 8D (snap pop). The data was collected from the Shoot House, as described above, and analyzed using the analysis methods of the present invention in the time domain. In this example, the signal energy was analyzed in the time domain using the methods of the present invention. Signal analysis in the time domain was able to distinguish threats from non-threat and the type of weapon used for the threat. The signal energy profiles are different for a 9 mm pistol as compared to a 22 pistol.

FIGS. 9A-D shows the acoustic waveforms in real-time amplitude vs. time for weapon alarm events FIG. 9A (38 revolver) and FIG. 9B (45 pistol) and for classroom reject events FIG. 9C (paper bag pop) and FIG. 9D (notebook slap). The data was collected from the Shoot House, as described above, and analyzed using the analysis methods of the present invention in the time domain. In this example, the signal energy was analyzed in the time domain using the methods of the present invention. Signal analysis in the time domain was able to distinguish threats from non-threat and the type of weapon used for the threat. The signal energy profiles are different for a 38 revolver as compared to a 45 pistol.

FIGS. 10A-D shows the acoustic waveforms in real-time amplitude vs. time for weapon alarm events FIG. 10A (shot gun—12 Gauge) and FIG. 10B (M4 Assault Rifle) and for classroom reject events FIG. 10C (paper bag pop) and FIG. 10D (notebook slap). The data was collected from the Shoot House, as described above, and analyzed using the analysis methods of the present invention in the time domain. Signal analysis in the time domain was able to distinguish threats from non-threat and the type of weapon used for the threat. The signal energy profiles are different for a 12 Gauge shot gun as compared to a M4 Assault Rifle.

Example 2

Shot Detection System Firmware Flow

The following processing steps provide validation for the analysis method described above and with reference to FIG. 4. The analysis method was embedded into the microcontroller and validated with live fire testing. Seven 112 ms windows were used to obtain both variance and zero-crossing counts for each individual window that were all combined into an "Adjusted Variance". The "Adjusted Variance" was used for comparison the "Alarm/Reject" threshold, described above, yielding a "classification" for the event. The validation steps are as follows:

Step 1: Wait acoustic "Event Detection" interrupt
Step 2: Start zero-crossing counter—repeatedly used to obtain individual zero-crossing counts for seven 112 ms (milliseconds) windows
Step 3: Digitize 16K points @ 7 microseconds/point=112 ms (8-bit resolution)
Step 4: Read & clear zero-crossing counter (Count #0)
Step 5: Digitize 16K points @ 7 us/point=112 ms (8-bit resolution)
Step 6: Read & clear zero-crossing counter (Count #1)
Step 7: Start zero-crossing counter, wait 112 ms, read and clear (Count #2)
Step 8: Repeat step #7 four more times (Count #3-6)
Step 9: Calculate energy variance on step #3 waveform (Variance #0)
Step 10: Calculate energy variance on step #5 waveform (Variance #1)
Step 11: Ratio counts for Count #1 and #2 and use the ratio multiplied by Variance #1 to become Variance #2
Step 12: Repeat step #11 for ratio of each sequential Count # with Count #1 and Variance #1 for new variance (Variances 3-6)
Step 13: Add seven Variances 0-6 for "Adjusted Variance"
Step 14: Compare "Adjusted Variance" to preset "Alarm Threshold"
Step 15: If event is an "Alarm" then archive the 32K waveform points along with the variances, count values & timestamp
Step 16: Initiate RF transfer of the "Alarm" event
Step 17: Return to Step #1

Algorithm and Analysis

In addition to these embodiments, in other embodiments the processing of the signals utilize two different signal processing algorithms which allow the detection and classification of the acoustic signals generated by firearm discharges in small enclosed spaces. The first is based on the logarithm of the signal energy. The second is joint entropy. In one embodiment a methodology using both signal energy and joint entropy is able to both detect weapon discharges and classify weapon type, in small spaces, with high statistical certainty (At least five sigma, typically much more than 9 sigma—greater certainty is possible it discharge time is used for classification).

Some algorithms reported here are capable of running on an embedded microcontroller system such as a Texas Instruments FRAM micro-controller unit number MSP430FR5989 that, with an associated microphone (InvenSense INMP404ACEZ-R7 microphone), is capable of signal acquisition and analysis. Moreover, such a system and software are suitable for widescale deployment in classrooms, movie theaters, and other public gathering places. These approaches are based on analysis of signal shape using signal energy and entropy carried by the acoustic waves. The analysis algorithms can run on a low-cost personal computer or embedded controller. Acquisition of input data (acoustic waveforms) can be accomplished using a low-cost prototype sensor developed at Pacific Northwest National Laboratory and already demonstrated. Unlike competing systems, this permits precise identification of the room in which firearm discharges occur.

In one example two different groups of acoustic data were collected a first group consisted of "threat-type" signals which were acquired by discharging several different firearms into a ballistic trap. This was done in order to sample an ensemble of acoustic sources that captures the variability found in various weapon types including non-military/police arms, i.e., in "street" weapons. A second group of control data was also acquired. These consisted of "false" alarms: a book slapped on a table, an air-filled paper bag "popping," and a wrench striking a metal ladder. Signals were collected in three different rooms of different dimensions: a large auditorium (12.8×8.4 m; height 2.7 m), a medium sized meeting room (4.6×6.1 m; height 2.7 m), and a small office (3.7×3.7 m; height 2.7 m). Acquisition of all data were completed during one 10 h interval. Acoustic signals were converted to electrical signals using a InvenSense INMP404ACEZ-R7 microphone connected to custom built amplifier circuitry. These signals were then digitized, single-shot fashion, by a Teledyne LeCroy MSO 104MXs B digital sampling oscilloscope to obtain raw data consisting of one million point waveforms (12-bit numbers; 1.0 MHz sampling rate). At least five waveforms for each type of acoustic source were acquired and stored for later analysis.

Several observations indicate that the experiment is governed, at least partially, by nonlinear dynamics occurring during the propagation of sound as well in the microphone during data capture. During acquisition of firearms signals, the marksman reported the ceiling tile immediately above the trap was being visibly displaced by the weapon discharge. Subsequent inspection of the digital waveforms on a fine time scale (not shown) reveals evidence of shock-like features. Moreover, the amplitude of firearm discharges in typically in over 100 dB and this is close to the rated limit of the microphone used in our study. We acquired waveforms for a single- and five-round discharge from the 223 caliber assault rifle. Both waveforms were Fourier transformed to obtain, respectively, $F_1(\omega)F1(\omega)$ and $F_5(\omega)F5(\omega)$. If the propagation was linear, or even weakly linear, then the inverse Fourier transform of $F_5(\omega)/F_1(\omega)$ $F5(\omega)/F1(w)$ should produce a time series having five delta function spikes. To avoid division by zero we actually divide by a modified version of $F_1(\omega)F1(\omega)$, specifically $$F_5(\omega)\tilde{F}_1(\omega), F5(\omega)\tilde{F}1(\omega), \qquad (1)$$

where $$\tilde{F}_1(\omega)=\{F_1(\omega) \rho \text{ if } \|F_1(\omega)\| \geq \rho, \text{if } \|F_1(\omega)\|<\rho, \tilde{F}1(\omega)=\{F1(\omega) \text{if } |F1(\omega)| \geq \rho, \rho \text{if } |F1(\omega)|<\rho, \qquad (2)$$

and $\rho=10_{-6}$ $\rho=10\text{-}6$ is a regularizing term. The inverse Fourier transform of this function was computed. The strong nonlinearities exhibited by the acoustics preclude identification of signal source using signal processing techniques based on linear systems theory such as matched filters. Instead, subsegments of the acoustic waveform were taken and produced a single number or receiver value.

The acoustic waveforms acquired for our study were denoted by f(t). The convention that the domain of f(t) is [0,1].

For f(t), the signal energy is then represented by the following:

$$E_f = \int_1^0 f(t)_2 dt. Ef = \int 01 f(t) 2 dt. \qquad (3)$$

Joint entropy of acoustic waveforms, f(t), using a reference function g(t) was then calculated. In the case where f(t) and g(t) are differentiable functions this entropy is given by $$H_{f,g} = -12\int_1^0 dt_{min[\|f(t)\|, \|g'(t)\|]} max[\|f'(t)\|, \|g'(t)\|]} - \int_1^0 dt \log\{\max[\|f'(t)\|, \|g'(t)\|]\}. Hf,g = -12\int 01 dt \min[|f'(t)|, |g'(t)|] \max[|f'(t)|, |g'(t)|] - \int 01 dt \log\{\max[|f'(t)|, |g'(t)|]\}. \qquad (4)$$

The goal of this study was to discover a suite of signal receivers that are suitable for two different tasks: discharge detection vs firearm identification. Consequently, after an initial "gating" operation to remove the noise-only pre-trigger portion of the digital waveform, two different preprocessing schemes were applied to the raw data, prior to computation of either signal energy or entropy. For signal energy computations the data were decimated (i.e., only every tenth point was kept) and then bandpass filtered to exclude frequencies outside of the range extending from 1 to 26 kHz. This was accomplished in the frequency domain by multiplying the Fourier transform of the raw data by the conjugate symmetric form of $$[\tan h_{(f-fl.b.a)}+1][\tan h_{(f u.b.-f)a)}+1]4, [\tan h(f-fl.b.a)+1][\tan h(fu.b.-f)a)+1]4, \qquad (5)$$

where $f_{l.b.}=10_3, f_{u.b.}=26\times10_3$ fl.b.=103, fu.b.=26×103, and the sharpness parameter for the filter was set to a=10. All computations are performed using units of Hertz. The logarithm of the signal energy was computed, according to Eq. 3 using 2.56 ms segments of the acoustic waveforms. The analysis was performed using a "moving window" analysis where the 2.56 ms window was placed initially at a point coincident with the signal arrival and the logarithm of the signal energy was computed. Subsequently, the window was moved in 2.56 ms steps, until the end of the data were reached. In this way, an array of signal energy log values was produced. In this study it was observed that analysis with the window placed at zero time was adequate for source classification. For entropy calculations only 32 µs segments of the acoustic waveforms were analyzed in moving window fashion, with a moving window shift of 1 µs. The rationale for the shorter window length was that its structure would be primarily determined by the attributes of the firearm and not those of the environment. As in the signal energy case, it was found that analysis with the window placed at zero time was adequate for source classification.

Figure 11:
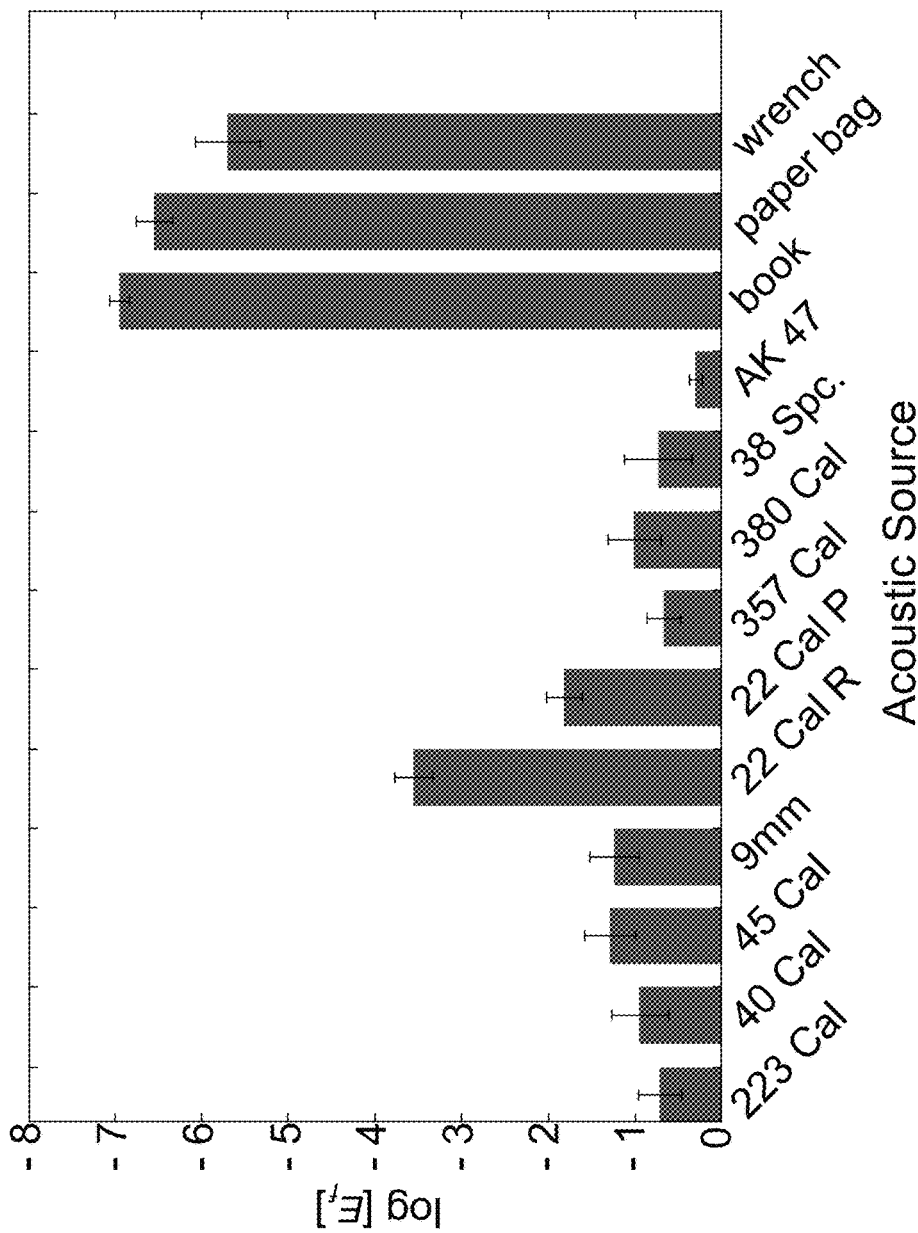
FIG. 11 shows separation of "threat-type" vs "nonthreat-type" by the logarithm of signal energy

Each of the waveforms acquired for each source type were analyzed as described above to obtain either log energy, $\log[E_f]$ log[Ef], or joint entropy, $H_{f,g}$ Hf,g. The mean and standard deviations of the ensemble for each source were then computed. FIG. 11 shows the results obtained for the $\log[E_f]$ log[Ef] analysis. The error bars in the plot are equal to one standard deviation. The data shows a wide separation between the threat-type and nonthreat-type bars. However, there appears to be little separation between either the 223 caliber (M16) and AK47 ("long rifles") and any pistols. This would be useful information in certain circumstances. In order to quantify this separation, the pair-wise differences between each acoustic source were computed along with associated standard deviation using the standard methods for error propagation.

From these, the mean difference, which can be either positive or negative, divided by the associated standard deviation was computed in order to obtain a noise-normalized measure of change between receiver values for different acoustic sources. This ratio, which we will use to quantify the sensitivity of analysis techniques, is often defined as the statistical confidence, and is the reciprocal of the coefficient of variation of a random variable. Larger values are better as they imply greater statistical separation between random variables, in our case signal receivers. Small values suggest that the sources are statistically indistinguishable to the signal receiver. The confidence values characterizing the relation between threat-type and nonthreat-type-signals are summarized in Table I. We observe that all confidences are larger than one, suggesting that these types of signals should be easily distinguished using only $\log[E_f]$ log[Ef]. Moreover, energy calculation is simple and well suited to our goal of reduction-to-practice on low cost hardware.

TABLE I

Confidence ratios of "threat-type" vs "nonthreat-type" sources using log[Ef] log[Ef].

|  | Book | Paper bag | Wrench |
|---|---|---|---|
| 223 cal. semiauto rifle | 22.60 | 17.68 | 11.03 |
| 40 cal. semiauto pistol | 17.50 | 14.43 | 9.57 |
| 45 cal. semiauto pistol | 18.10 | 14.5 | 9.28 |
| 9 mm semiauto pistol | 19.22 | 15.26 | 9.59 |
| 22 cal. semiauto rifle | 15.81 | 10.63 | 5.11 |
| 22 cal. semiauto pistol | 22.07 | 16.05 | 9.09 |
| 357 cal. revolver pistol | 28.66 | 20.69 | 12.00 |
| 380 cal. semi auto pistol | 19.41 | 15.57 | 9.95 |
| 38 special revolver pistol | 15.19 | 13.00 | 9.13 |
| AK47 semiauto rifle | 55.76 | 28.77 | 14.28 |

As mentioned previously, discrimination between threat-type waveforms would be useful information. Table II summarizes the absolute values of all confidence ratios obtained in pair-wise comparison of $\log[E_f]$ log[Ef] values for threat-type sources. Only the values below the diagonal are shown since the table is symmetric about this line. We observe that many entries are greater than one, suggesting that in many cases highly reliable discrimination between sources is possible. However, there are also many entries that are less than one. Particularly troubling is the fact that several of these entries appear in the first column indicating that $\log[E_f]$ log[Ef] provides poor discrimination between several pistols and the assault rifle.

TABLE II

Confidence ratios for different "threat-type" sources obtained using log[Ef] log[Ef] analysis.

|  | 223 | 40 Cal. | 45 Cal. | 9 mm | 22 Cal. (R) | 22 Cal. (P) | 357 Cal | 380 Cal | 38 Spc. | AK 47 |
|---|---|---|---|---|---|---|---|---|---|---|
| 223 cal. semiauto rifle (M16) | — | — | — | — | — | — | — | — | — | — |
| 40 cal. semiauto pistol | 0.59 | — | — | — | — | — | — | — | — | — |
| 45 cal. semiauto pistol | 1.48 | 0.76 | — | — | — | — | — | — | — | — |
| 9 mm semiauto pistol | 1.40 | 0.66 | 0.12 | — | — | — | — | — | — | — |
| 22 cal. semiauto rifle | 9.09 | 6.98 | 6.57 | 7.00 | — | — | — | — | — | — |
| 22 cal. semiauto pistol | 3.37 | 2.23 | 1.47 | 1.67 | 6.32 | — | — | — | — | — |
| 357 cal. revolver pistol | 0.16 | 0.78 | 1.78 | 1.71 | 10.92 | 4.10 | — | — | — | — |
| 380 cal. semiauto pistol | 0.80 | 0.14 | 0.66 | 0.55 | 7.49 | 2.26 | 1.03 | — | — | — |
| 38 special revolver pistol | 0.04 | 0.44 | 1.13 | 1.05 | 6.50 | 2.43 | 0.16 | 0.58 | — | — |
| AK47 semiauto rifle | 1.55 | 1.96 | 3.28 | 3.29 | 16.96 | 7.07 | 1.77 | 2.43 | 1.06 | — |

Figure 12:
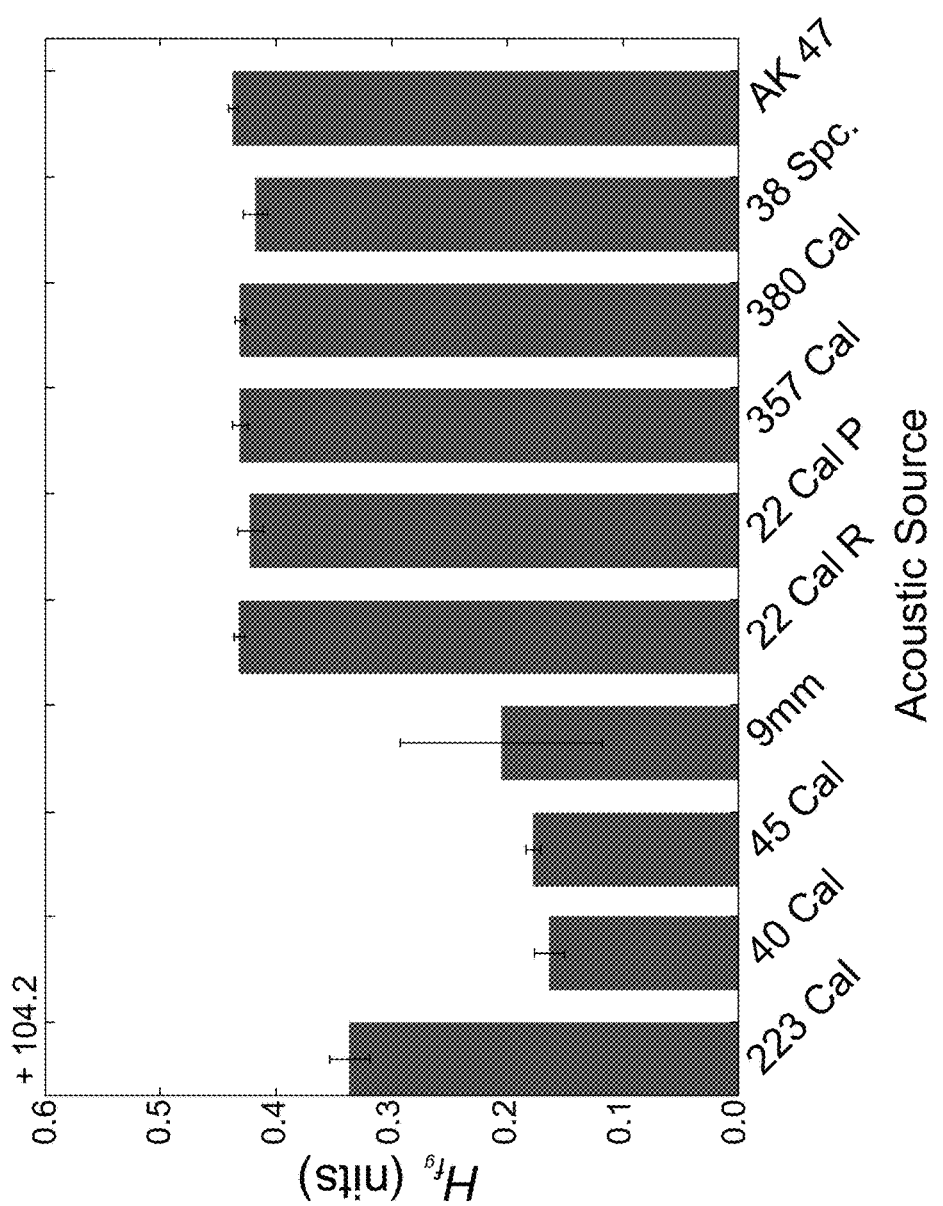
FIG. 12 shows the separation of the acoustic signatures of different firearms by joint entropy

Consequently, we have investigated the use of different joint entropies, $H_{f,g\ i}$ Hf,gi, as an additional tool for weapons identification. Each reference function, $g_i(t)$ gi(t), was generated using one of the threat-type waveforms according to the methods described previously, for instance $g_1(t)$ g1(t) was computed using one of the 223 rile waveforms, $g_2(t)$ g2(t) was computed using one of the 40 caliber waveforms and so forth with $g_{10}(t)$ g10(t) being computed using one of the AK47 rifle waveforms. An example plot of the entropies $H_{f,g\ 1}$ Hf,g1 along with associated standard deviation bars, obtained using the reference function generated using a 223 caliber waveform is shown in FIG. 12. The figure shows a clear separation between the "long rifle" 223 data and the "pistol" 40 caliber, 45 caliber, and to a lesser extent, 9 mm data. For this plot, the confidence ratios quantifying the separation between the 223 (a "long rifle") and the 357 caliber and 380 caliber pistols data improves from the Table II values of 0.16 and 0.80 to 5.58 and 5.69, respectively. However, for the 22 caliber rifle to confidence is decreased from its Table II value of 9.09 to 5.64. $H_{f,g}$ Hf,g. The reference was computed using a step-like function with transitions at the extrema of one of the 223 assault rifle waveforms.

TABLE III

Maximum confidence ratios for different "threat-type" sources obtained using $H_{f,g}$ Hf, g analysis for $g_i(t)$ gi(t) derived from different acoustic sources.

|  | 223 | 40 Cal. | 45 Cal. | 9 mm | 22 Cal. (R) | 22 Cal. (P) | 357 Cal | 380 Cal | 38 Spc. | AK 47 |
|---|---|---|---|---|---|---|---|---|---|---|
| 223 cal. rifle semiauto rifle(M16) | — | — | — | — | — | — | — | — | — | — |
| 40 cal. semiauto pistol | 8.61 | — | — | — | — | — | — | — | — | — |
| 45 cal. semiauto pistol | 8.63 | 1.42 | — | — | — | — | — | — | — | — |
| 9 mm semiauto pistol | 1.48 | 1.00 | 0.65 | — | — | — | — | — | — | — |

TABLE III-continued

Maximum confidence ratios for different "threat-type" sources obtained using $H_{f,g}$ Hf,g analysis for $g_i(t)$ gi(t) derived from different acoustic sources.

| | 223 | 40 Cal. | 45 Cal. | 9 mm | 22 Cal. (R) | 22 Cal. (P) | 357 Cal | 380 Cal | 38 Spc. | AK 47 |
|---|---|---|---|---|---|---|---|---|---|---|
| 22 cal. semiauto rifle | 5.64 | 53.46 | 29.92 | 7.40 | — | — | — | — | — | — |
| 22 cal. semiauto pistol | 4.30 | 38.33 | 18.00 | 9.33 | 1.16 | — | — | — | — | — |
| 357 cal. revolver pistol | 5.58 | 40.44 | 27.67 | 9.71 | 0.91 | 1.74 | — | — | — | — |
| 380 cal. semiauto pistol | 5.69 | 59.04 | 31.65 | 9.80 | 1.24 | 1.94 | 0.58 | — | — | — |
| 38 special revolver pistol | 4.06 | 16.59 | 17.75 | 6.01 | 1.37 | 0.48 | 1.37 | 1.42 | — | — |
| AK47 semiauto rifle | 5.67 | 37.20 | 26.57 | 9.79 | 0.95 | 1.96 | 0.49 | 0.51 | 1.55 | — |

Figure 13:
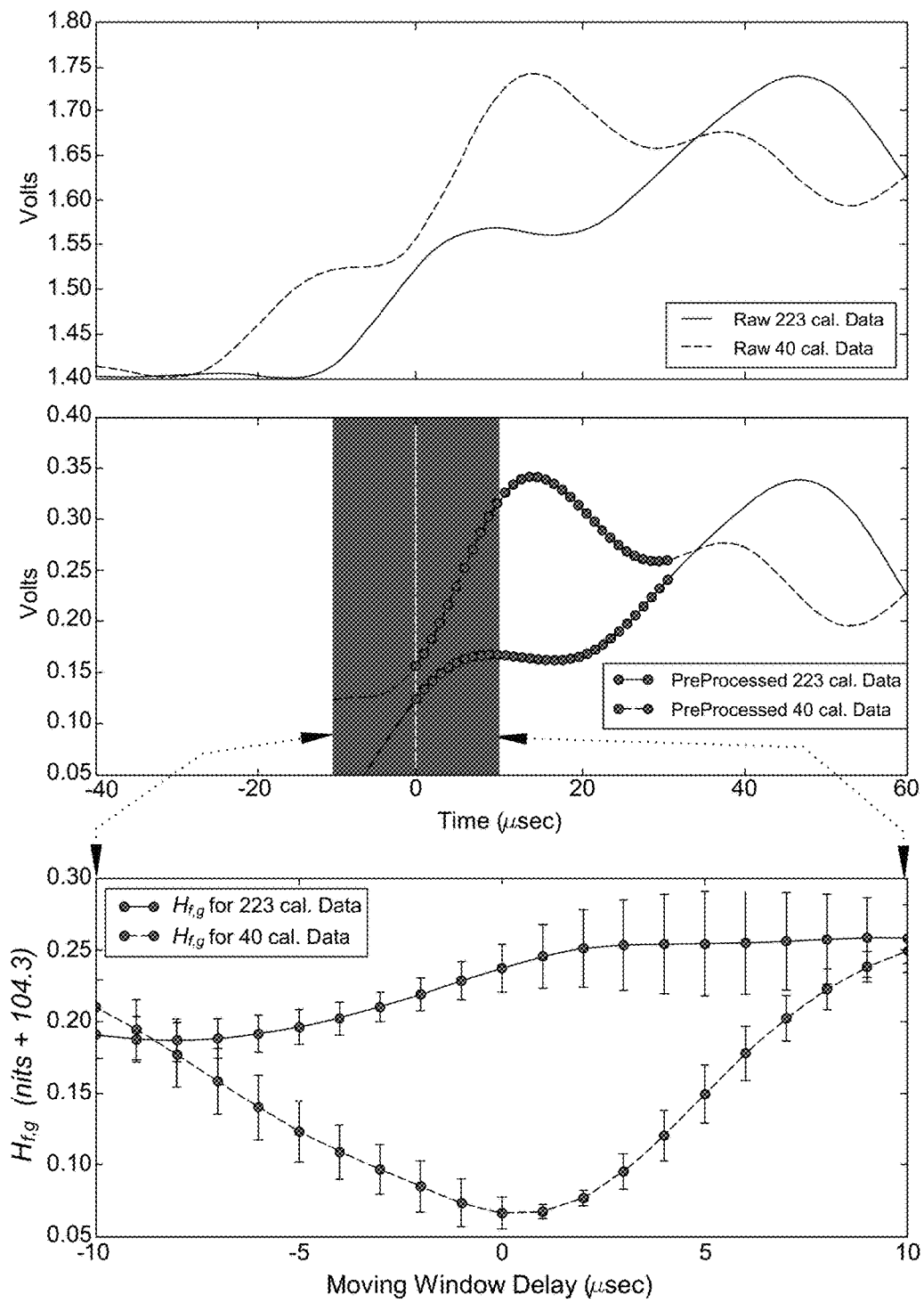
FIG. 13 shows the effect of changing analysis parameters on the result analysis.

A comparison of 223 assault rifle and 40 caliber pistol in the discussion that follows as it is a typical result. The sensitivity of $H_{f,g}$ Hf,g analysis to this parameter is illustrated in three panels shown in FIG. 13, where the analysis of a waveform captured from discharge of the 223 caliber assault rifle is compared with a discharge from a 40 caliber pistol. In the top panel are shown 110 μs segments that capture the arrival of the acoustic waveforms at the sensor. We observe that the shape of the pulses at first arrival is noticeably different. This observation motivated the entropy analysis investigation, which previous reports have shown is more sensitive to changes in shape of waveforms than is signal energy analysis. The middle panel shows the curves for processed raw data overlain with circular symbols placed at the locations of the 32 time domain points used to compute $H_{f,g}$ Hf,g. Also shown in the middle panel is a gray region containing twenty points that were also used as the starting points for 32μ windows over which $H_{f,g}$ Hf,g was computed as part of the moving window analysis. The bottom panel shows the resulting $H_{f,g}$ Hf,g for both firearms. Only the first four and the last three points, where the error bars of the firearms overlap, fail to distinguish the two weapon types. These results, which are also typical of signal energy, show that the reported $H_{f,g}$ Hf,g results summarized in FIG. 12 are, at least to the order of a few microseconds, insensitive to analysis window placement as long as it primarily encompasses the arrival of the waveform. Given the capabilities of modern data acquisition equipment in relation to the length of this window of stability, it seems reasonable to conclude that $H_{f,g}$ Hf,g can provide a robust metric for classifying acoustic signatures into different weapon-type categories.

The results summarized in Tables II and III show that a statistical detection and identification system based on the complementary use of the logarithm of signal energy and the joint entropies can simultaneously detect discharge of firearms and classify their type. For each firearm type there exists a receiver, either log[$E_f$] log[Ef] or one of the entropies $H_{f,g\ i}$ Hf,gi, that is tightly clustered with a large enough difference in mean values between different weapon types so that even a small sample of waveforms would be sufficient for statistical identification. In many cases, those where confidence ratios are larger than five, it appears that even a single weapon discharge would permit classification of a firearm into either the category of pistol or long rifle.

The case where the standard deviation (σ) is less than five, identification and classification would still be possible since, unfortunately, multiple acoustic emissions from each firearm source would likely be available. In that case, statistical analysis could be based on the standard deviation of the mean (σ/n−√σ/n), which decreases like 1/n−√1/n as the number, n of waveforms of each weapon type increases. For even a few discharges of each weapon type, σ/n−√σ/n would rapidly decrease so that the separations between accumulating mean values would approach five standard errors of the mean provided that the standard deviation exceeded one.

To put these numbers in context suppose for the moment that the underlying distributions are normal. Then, taking the number of public elementary, middle, and high schools in the United States to be 100 000, and assuming that each school has 1000 rooms and that there is an acoustic event in each of these rooms once an hour for 24 h every day of the year, five sigma implies one false call will be made per century. While some of the numbers in this estimate may seem high, particularly the number of rooms per school, they have been chosen in order to provide an overestimate of the possible error rate.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A method for determining a type and location of a firearm discharge in a confined environment comprising the steps of:
   receiving a digitized acoustic signal from a sensor within the confined environment;
   calculating a logarithmic value of a signal intensity from said signal;
   calculating a logarithmic value of a joint entropy from said signal; and
   statistically comparing the logarithmic values of signal intensity and joint entropy to determine the type and location of the firearm discharge.

2. The method of claim 1 wherein energy contained in the digitized acoustic signal is measured in a 5 kHz to 30 kHz frequency range and in a 0.9 MHz to 1.0 MHz frequency range.

3. The method of claim 1 wherein energy contained in the digitized acoustic signal in the 5 to 30 kHz range is used to distinguish between threat and non-threat events, and the measured signal in the 0.9 MHz to 1.0 MHz range is used to measure a number of weapon discharges.

4. The method of claim 1 further comprising the step of transmitting another signal to at least one of the following for emergency response: a computer, a mobile device, a data storage device, and a central alarm system.

5. A system for detecting and analyzing a threat in a confined environment comprising:
   a. a microphone for receiving acoustic signals from the confined environment;

b. a microcontroller configured to compute and analyze joint entropy of the signals to identify one of a plurality of different types of threats; and
c. a transceiver for transmitting information regarding the identified one of the different types of threats for emergency response.

6. The system of claim 5 wherein the microcontroller is configured to compute and analyze the joint entropy of the signals to distinguish between a threat and a non-threat event.

7. The system of claim 5 wherein the threats are threats from different types of firearms, and the microcontroller is configured to compute and analyze the joint entropy of the signals to identify one type of the firearms from a plurality of other types of the firearms.

* * * * *

UNITED STATES PATENT AND TRADEMARK OFFICE
CERTIFICATE OF CORRECTION

PATENT NO. : 10,290,195 B2
APPLICATION NO. : 15/440902
DATED : May 14, 2019
INVENTOR(S) : James R. Skorpik, Michael S. Hughes and Eric G. Gonzalez Page 1 of 1

It is certified that error appears in the above-identified patent and that said Letters Patent is hereby corrected as shown below:

On the Title Page

Item (56) References Cited: page 2, 1st column, 29th line - Replace "Stoughton, R., Measurements of small-caliber ballistic shop waves" with --Stoughton, R., Measurements of small-caliber shock waves--

Item (56) References Cited: page 2, 2nd column, 4th line - Replace "quency Control vol. 53, No. 9, Sep. 2006, United Stated, pp." with --quency Control vol. 53, No. 9, Sep. 2006, United States, pp.--

Item (56) References Cited: page 2, 2nd column, 11th line - Replace "ference Praceedings 1706, 2016, United States, 7 pages" with --ference Proceedings 1706, 2016, United States, 7 pages--

In the Specification

Column 9, Line 32 - Replace "F5($\omega$)/F1(w)" with --F5($\omega$)/F1($\omega$)--

Column 12, Line 38 - Replace "223 rile" with --223 rifle--

Signed and Sealed this
Thirty-first Day of December, 2019

Andrei Iancu
*Director of the United States Patent and Trademark Office*